G. W ELLIOTT,

Assignor to A. A. MELLIER.

Saddle Bags.

No. 9,669. Reissued April 19, 1881.

Attest.
Charles Pickles
J. E. Knight.

Inventor.
Geo. W. Elliott,
By
Knight Bros.
Attys.

N. PETERS, PHOTO-LITHOGRAPHER, WASHINGTON, D. C.

UNITED STATES PATENT OFFICE.

GEORGE W. ELLIOTT, OF SAN ANTONIO, TEXAS, ASSIGNOR TO AUGUSTUS A. MELLIER, OF ST. LOUIS, MISSOURI.

SADDLE-BAGS.

Specification forming part of Reissued Letters Patent No. 9,669, dated April 19, 1881.

Original No. 98,857, dated January 18, 1870. Application for reissue filed February 15, 1881.

*To all whom it may concern:*

Be it known that I, GEORGE W. ELLIOTT, of San Antonio, in the county of Bexar and State of Texas, formerly of Rocheport, in the county of Boone and State of Missouri, have invented certain new and useful Improvements in Saddle-Bags, of which the following is a full, clear, and exact description, reference being had to the accompanying drawings, forming part of this specification.

My invention relates to an improvement in saddle-bags for use by traveling physicians; and my invention consists, first, in two cases for containing medicine, &c., formed with an upper and lower receptacle each, and connected together by means of a strap having flap ends, which extend down over the face of the upper receptacle and secure the lower receptacle against the upper one; secondly, in providing the lower receptacle with means for tilting outward, so that its top may be exposed to allow access to its contents; thirdly, to the means of holding the lower receptacle in place when in its tilted position, which means consists in a curved slot in said receptacle, in which works a rivet or pin secured to the case; and, fourthly, in forming both upper and lower receptacles out of one piece of material, as hereinafter explained.

Figure 1:
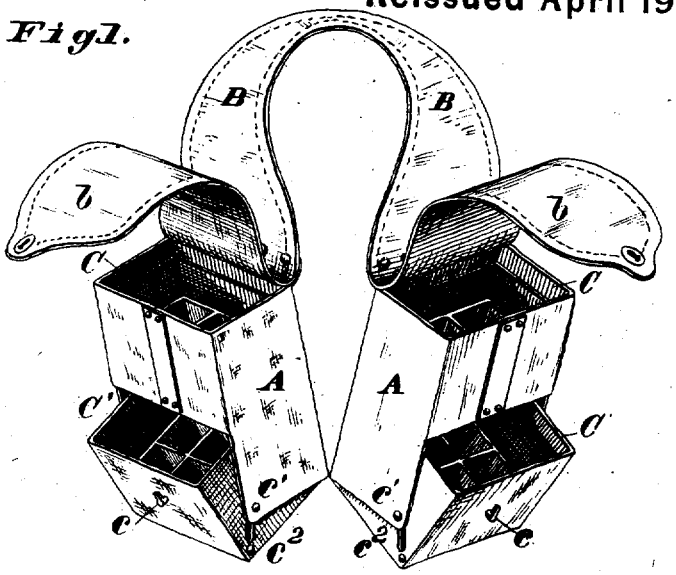
Figure 2:
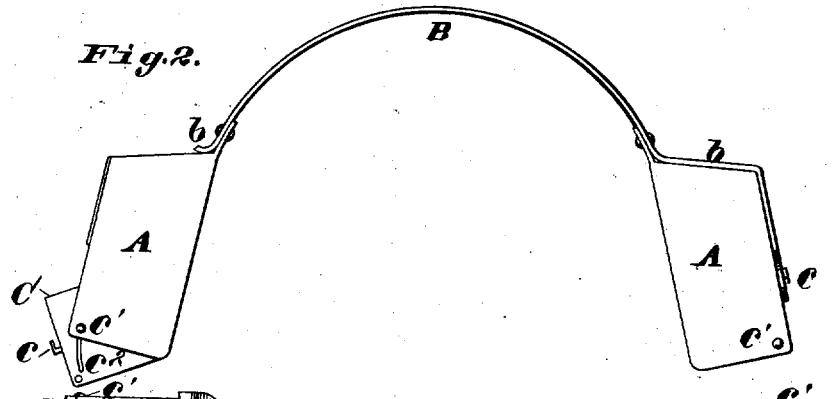
Figure 3:
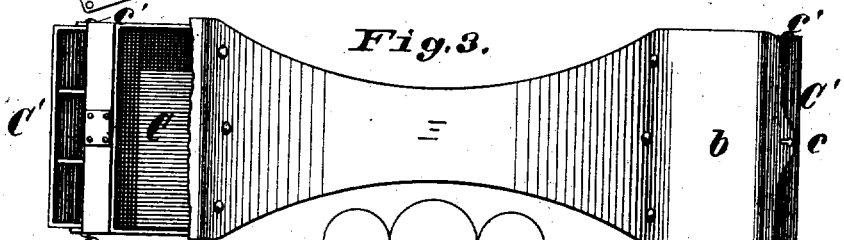
Figure 4:
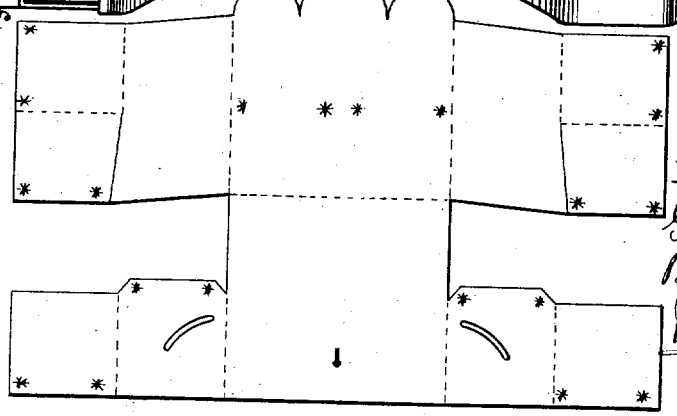

In the drawings, Figure 1 is a perspective view of my improved saddle-bag, showing the flap end detached from the lower receptacle, which is in its outward position. Fig. 2 is a side elevation, showing to the left the flap broken away and the receptacles as placed for using their contents, and on the right the flap fastened down and the cases as packed ready for carriage. Fig. 3 is a top view of same. Fig. 4 is a plan of the piece of material out of which the cases may be cut and formed.

The material usually employed for making said bags is leather; but other material similar in texture may be used.

A A are the cases, which are connected together by a strap, B.

*b b* are flap ends, which form covers to the upper receptacles, C, and which, when the lower receptacles, C′, are in their closed position, are secured thereto, usually by a button, *c*, for holding them in said position. I have shown the button *c* as consisting of a turn-bolt with an elongated head.

I prefer to arrange the receptacles of each case in double tiers, and when so arranged the material from which they are formed may be cut into the shape shown in Fig. 4, where full lines indicate edges cut and dotted lines edges folded. The rivets for securing the parts together are indicated by stars. By said means the upper and lower receptacles are readily formed, the joined edges being riveted or sewed together.

In order that ready access may be had to the contents of the lower receptacle, it is so formed, as above stated, that its top may tilt outward. The distance of its outward tilting may be limited by a rivet or pin, $c'$, secured to the side of the case A, as shown, and working in a curved slot, $c^2$, in said lower receptacle. The slot $c^2$ may be of any desired length, which limits the distance to which the receptacle is allowed to tilt outward. The side pieces of the case A may very properly be braced or strengthened by means of a tin or zinc plate.

I prefer to line the lower and upper receptacles, C′ C, with a metallic lining, which at the same time may be so arranged as to subdivide said receptacles to receive small vials, &c. This lining serves not only to stiffen said receptacles, but serves also to prevent the corrosion of the leather by acid liquids.

It will be seen that the parts of my bag ordinarily resting against the saddle have no seams and but one rivet-joint to each case, which is made by connecting the case A to the strap B. By this construction the durability of the bag is equal to that of the leather itself at the points subject to the greatest wear.

I claim as my invention—

1. In a saddle-bag, the combination of a strap, B, flaps *b b*, and cases A A, having two receptacles, the said flaps adapted to cover the upper receptacles and to securely hold the lower receptacles of the said cases in closed position, as set forth.

2. The combination, with the strap B, having flaps *b b*, of the cases A A, each having an upper receptacle, C, and a lower receptacle, C′, held together by the said flaps, as set forth.

3. The rivet-and-slot connection $c'$ $c^2$, in combination with an upper receptacle, C, lower receptacle, C′, and side pieces, as set forth.

4. In a saddle-bag, a receptacle, C, having side pieces, and a lower receptacle, C′, connected to and adjustable on its said side pieces by a rivet, $c'$, and slot $c^2$, so as to tilt, as set forth.

5. The blank herein shown and described, adapted to form a case having two receptacles, C C′, as set forth.

GEORGE W. ELLIOTT.

Witnesses:
G. P. HARRISON,
R. HALPERT.